United States Patent [19]
Watanabe et al.

[11] Patent Number: 5,761,486
[45] Date of Patent: Jun. 2, 1998

[54] METHOD AND APPARATUS FOR SIMULATING A COMPUTER NETWORK SYSTEM THROUGH COLLECTED DATA FROM THE NETWORK

[75] Inventors: Yutaka Watanabe; Yasuaki Muraki; Takashi Nakagawa, all of Kawasaki, Japan

[73] Assignee: Fujitsu Limited, Kawasaki, Japan

[21] Appl. No.: 638,771

[22] Filed: Apr. 29, 1996

[30]  Foreign Application Priority Data

Aug. 21, 1995 [JP] Japan .................. 7-211595

[51] Int. Cl.$^6$ .......................... G06F 9/455
[52] U.S. Cl. .......................... 395/500
[58] Field of Search ............. 395/500, 200.01; 370/252; 455/33.1; 379/14, 59; 364/578, 512

[56]  References Cited

U.S. PATENT DOCUMENTS

| | | | |
|---|---|---|---|
| 5,285,494 | 2/1994 | Sprecher et al. | 379/59 |
| 5,410,586 | 4/1995 | Davies | 379/14 |
| 5,561,841 | 10/1996 | Markus | 455/33.1 |
| 5,598,532 | 1/1997 | Liron | 395/200.01 |
| 5,600,632 | 2/1997 | Schulman | 370/252 |

FOREIGN PATENT DOCUMENTS

| | | |
|---|---|---|
| 0 595 440 | 5/1994 | European Pat. Off. . |
| 96/13107 | 5/1996 | WIPO . |

*Primary Examiner*—Kevin J. Teska
*Assistant Examiner*—Dan Fiul
*Attorney, Agent, or Firm*—Staas & Halsey

[57]  ABSTRACT

A simulator apparatus collects communication information on a transmission line by a line information collecting module, extracts the communication information between a server and clients from the collected communication information by an information extracting module, and further discriminates the communication information necessary for a simulation on a protocol unit basis from the communication information and converts to a simulating procedure by a procedure converting module. A simulation processing module performs a simulating operation of the client for the server in accordance with a simulation definition file of the simulating procedure and operating conditions and stores an operating situation to a performance log file.

50 Claims, 15 Drawing Sheets

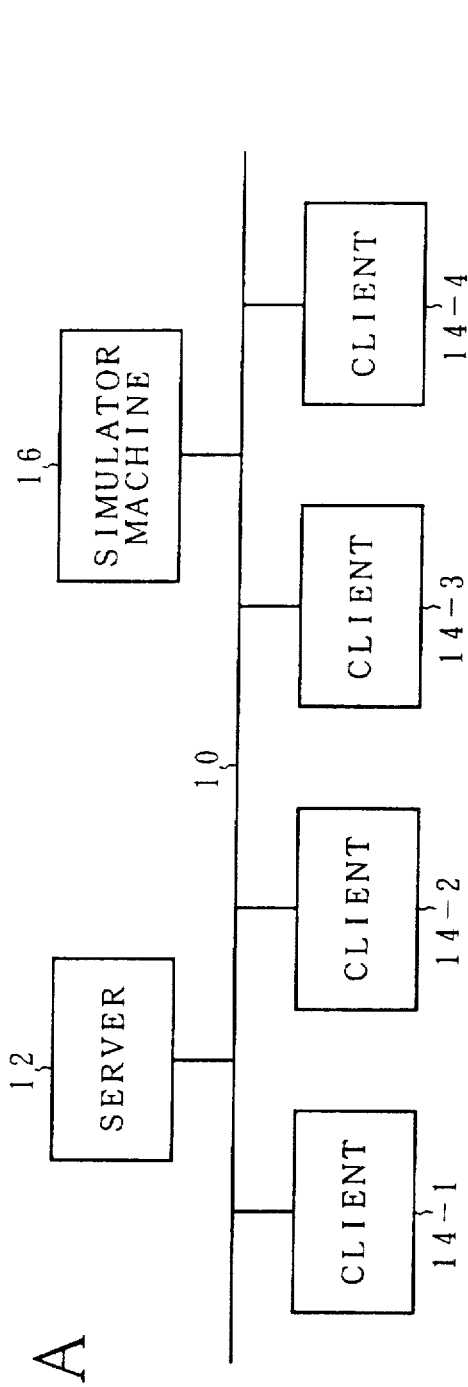
F I G. 1 A
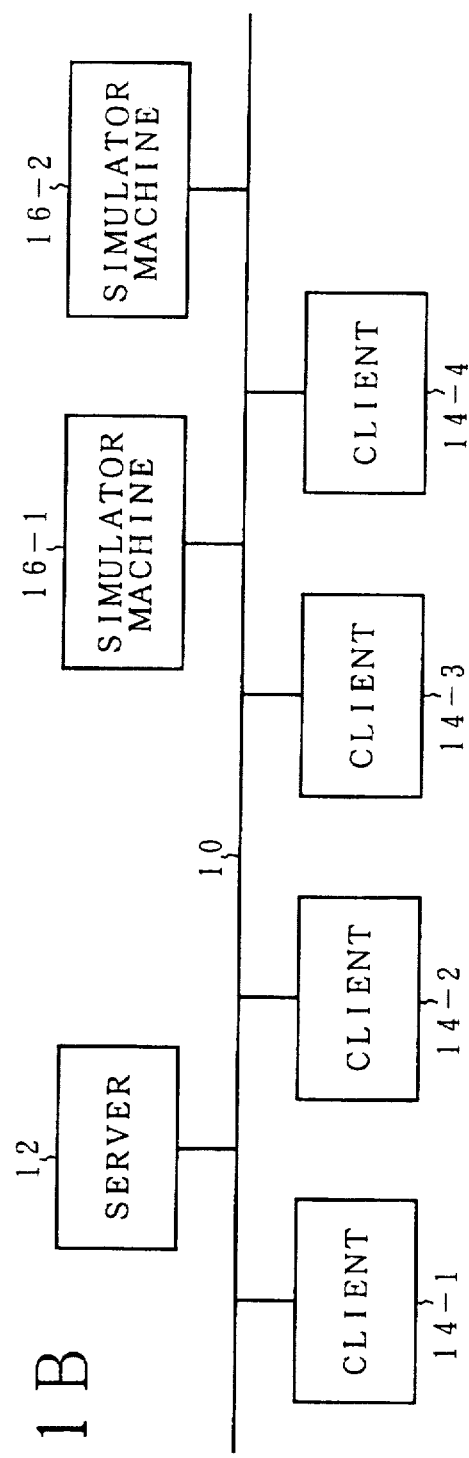
F I G. 1 B

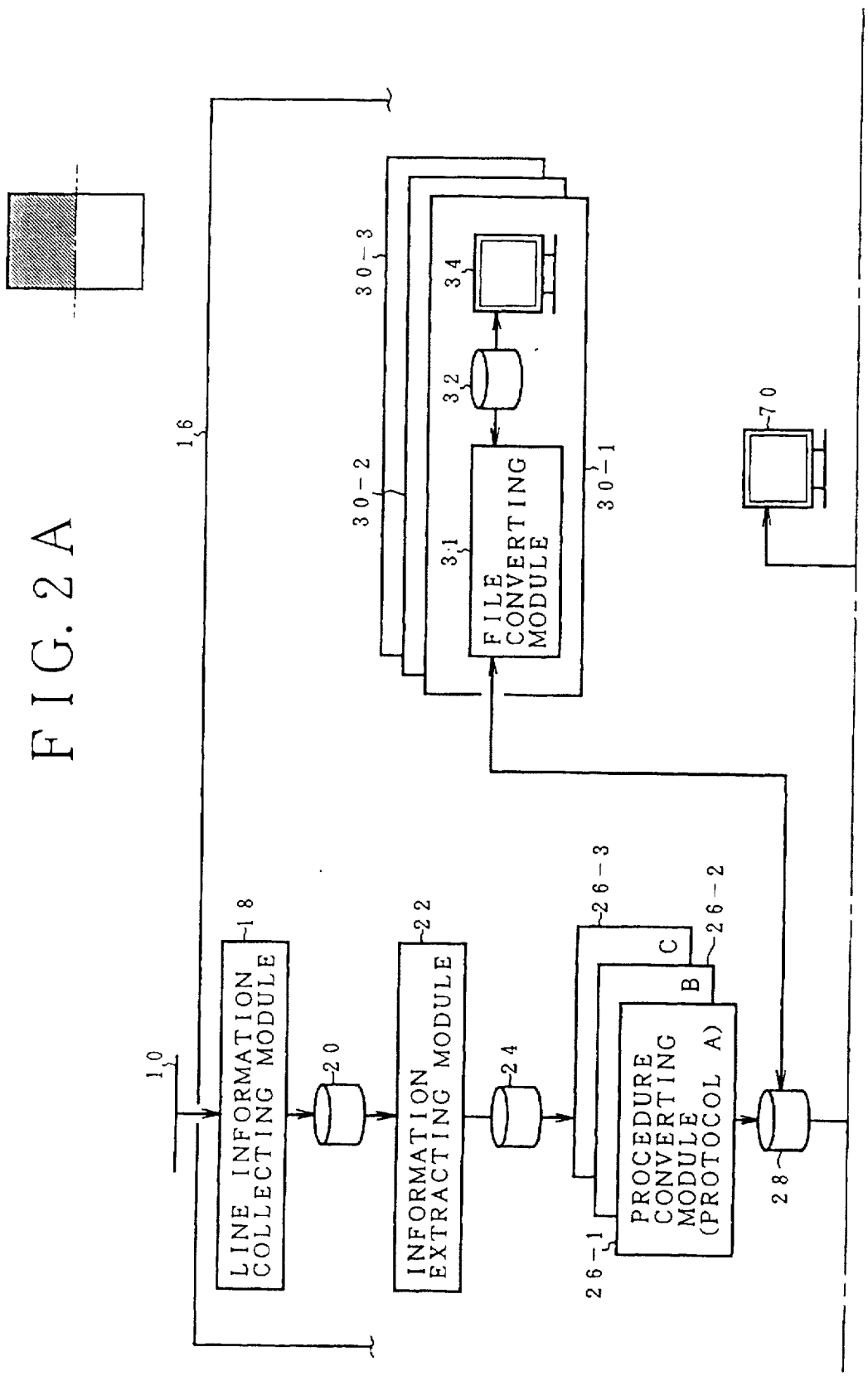

METHOD AND APPARATUS FOR SIMULATING A COMPUTER NETWORK SYSTEM THROUGH COLLECTED DATA FROM THE NETWORK

BACKGROUND OF THE INVENTION

The present invention relates to method and apparatus for a computer network system for simulating a procedure for transaction communications which are executed between clients and a server or terminals and a host which are connected to a transmission line such as a local area network or the like and, more particularly, to method and apparatus for simulating a computer network by using communication information on a transmission line.

DESCRIPTION OF THE RELATED ART

Hitherto, in a computer network system in which a host computer and a plurality of terminals are connected by a network such as an LAN or the like, it is necessary to evaluate an operating state of the system, to grasp a situation in which transactions are concentrated between a specific client and a server or a situation of a time-dependent transaction, to examine a reconstruction of the system or a change in operating form, and to always make the most of a performance of the system. In order to evaluate such a computer network system, it is considered to use a simulator apparatus for falsely executing the transactions which are actually executed between the clients and the server, thereby evaluating the performance. In case of constructing the simulator apparatus to be used to evaluate the performance of the computer network system, it is necessary to analyze the transaction according to various protocols which are executed in the computer network as a target and to form a simulating procedure having a form that is approximate to the actual transaction on the basis of the analysis result.

However, ordinarily, since a vender of the protocol doesn't open the contents, it is usually difficult that a maker providing the simulator apparatus knows the details of the protocol and transaction contents of the computer network of the user as a target, so that it is impossible to form a simulating procedure equivalent to the transaction which is actually performed. Therefore, an unconditional simulating procedure has to be used in consideration of a transaction form of the system, and even if such a simulating procedure which is fairly away from such an actual operation is used, a correct evaluation of the performance of the system cannot be expected.

SUMMARY OF THE INVENTION

According to the invention, there is provided an apparatus for simulating a computer network system in which communication information can be directly collected from a transmission line of the computer network system and can be reflected as it is to a simulating procedure and a correct evaluation of a performance of the system can be expected by a simulation having a procedure equivalent to a transaction which is actually executed.

According to the invention, first, there is provided a simulator apparatus which is used in a computer network system to which clients serving as transmitting source units and a server serving as a reception destination unit are connected via a transmission line and which performs a communicating process of a transaction in accordance with one or a plurality of communication protocols among the clients and the server.

According to the invention, the simulator apparatus comprises: a line information collecting module for collecting communication information, for example, packet information on a transmission line; communication information extracting module for extracting communication information between the clients (transmitting source units) and the server (reception destination unit) from the communication information collected by the line information collecting module; procedure converting module for discriminating the communication information necessary for a simulation which is matched with designated conditions from the communication information extracted by the communication information extracting module and for converting to a simulating procedure; and a simulating processing module for executing a communicating process in accordance with the simulating procedure converted by the procedure converting module. In this instance, since transaction communication information according to a plurality of protocols is generally transmitted and received on the transmission line, the procedure converting module forms the simulating procedure on a protocol unit basis. When converting the extracted communication information to the simulating procedure, the procedure converting module has an edition processing module for correcting procedure contents. The edition processing module executes a process on a protocol unit basis as well. The edition processing module forms a simulating procedure of the client who requests a process to the server on the basis of the converted simulating procedure. In this case, after a file format of the simulating procedure was converted to a file format which can be recognized by the user, the edition processing module corrects the file format and, after that, converts to the original file format. The edition processing module also corrects intervals of a transmitting time and/or a reception time in the simulating procedure before the correction and forms a simulating procedure for allowing a plurality of clients to simultaneously execute the simulating operations for one server. The simulating procedure converted by the procedure converting module has a file structure constructed by a simulation initialization processing module, a simulation communicating module, and a simulation end processing module. The simulation communicating module arranges a simulation command and simulation command data based on the communication information collected from the transmission line to a portion between simulation control information at the start of the communication and the end of the communication. The simulation processing module has a simulation defining module for defining simulator operating conditions and executes the simulating operation of the clients for the server on the basis of the simulator operating conditions defined by the simulation defining module and the simulating procedure converted by the procedure converting module.

The simulation defining module changes the simulator operating conditions as necessary. That is, the simulation defining module defines at least the number of transmitting source units which are simulated by the simulation (number of clients which are simulated), a server name of a reception destination by the simulation, and a unit name of a simulator machine as simulator operating conditions. The simulation defining module defines an apparatus name of the apparatus itself as a unit name of the simulator machine and also defines an apparatus name of the other simulator machine which is further provided in the outside and can set to a simulator apparatus with a multi-machine construction. The simulation defining module further defines a log file name, a simulator variable value, and an automatic execution command as simulator operating conditions. The automatic execution command is, for example, a control command for instructing a systematic operation to a reception destination server to be simulated via the transmission line and is prepared separately from the simulating procedure as a command train of the simulating operation. As automatic execution commands, at least a simulation start time execution command, a communication start time execution command, a communication end time execution command, and a simulation end time execution command are used.

The simulation processing module has a simulator control module. The simulator control module forms and activates one or a plurality of group control modules every transaction unit. The group control module has a terminal control module and forms one or a plurality of client modules serving as transmitting source units which are simulated as simulators by the activation of the terminal control module. The terminal control module provides a simulating procedure to the client module, thereby allowing the simulating operation to be performed. When a plurality of simulating procedures are derived by the conversion of a protocol unit, the simulator control module forms the group control module every simulating procedure and simultaneously executes the simulations of a plurality of transactions. In the case where the simulating procedures corresponding to a plurality of transactions are also obtained by the conversion of a specific protocol, the simulator control module also forms the group control module every simulating procedure and simultaneously executes the simulations of the plurality of transactions. That is, the simulation using a plurality of converted simulating procedures can be performed without being restricted by the protocol. In the case where an apparatus name of another simulator apparatus provided in the outside has been defined as a simulator apparatus by the simulator defining module in addition to the own apparatus name, the simulator control module also forms the group control module in the defined external simulator apparatus including the own apparatus and activates. In this case, the simulator control module of the simulator apparatus sets the self module to a master, sets the group control module provided for the external simulator machine to a slave, and activates them via the transmission line. The client module provided for the group control module records an operating situation each time a command of the simulating procedure is executed. The simulation processing module also has the monitor control module for displaying the simulator operating situation in a real-time manner and also has a log control module for recording the simulator operation and forming a performance log file. Further, on the basis of the performance log file formed by the log control module, the simulation processing module has a performance collecting module for collecting, analyzing, and providing apparatus performances. In this instance, although the transmitting source unit has been set to the client and the reception destination unit has been set to the server, it is also possible to set the transmitting source unit to a terminal machine and to set the reception destination unit to a host.

According to the invention, there is also provided a method of simulating a computer network. That is, a method of simulating a computer system to which a plurality of units are connected through a transmission line and in which a communicating process is performed between an arbitrary transmitting source unit and a reception destination unit in accordance with a predetermined protocol, comprises:

a line information collecting step of collecting communication information on the transmission line;

a communication information extracting step of extracting communication information between a specific transmitting source unit and the reception destination unit from the communication information collected by the line information collecting step;

a procedure converting step of discriminating communication information necessary for the simulation which is matched with designated conditions from the communication information extracted by the communication information extracting step and converting to a simulating procedure; and a simulation processing step of executing a communicating process in accordance with the simulating procedure converted by the procedure converting step.

The details in the method are substantially the same as those in case of the apparatus.

According to such apparatus and method for simulating the computer network of the invention, by collecting the communication information on the line and converting to the simulating procedure on a protocol unit basis, the simulating procedure equivalent to a transaction between the designated client and the server can be automatically formed. Therefore, the maker and user can easily perform a simulation equivalent to the actual operation without needing to form the simulating procedure while being aware of the protocol. In the case where the simulating procedure could be converted from the communication information on the transmission line, the simulating operation of a plurality of clients can be easily realized for the server by performing a correcting conversion to a procedure in which the simulation can be simultaneously performed by a plurality of clients. The simulating procedure among the plurality of clients and one server, namely, the simulating procedure of n:1 can be also performed on a protocol unit basis. Further, since the simulating operation condition can be defined separately from the simulating procedure which is formed by collecting the communication information of the transmission line, the transaction of a multi-protocol using a plurality of simulating procedures can be simulated by merely changing the definition of the operating conditions such as number of apparatuses and the like. Further, the simulations can be individually constructed on a transaction unit basis and can be simultaneously executed. The simulation with a multi-machine construction can be also performed by designating the external simulator apparatus in addition to the simulator apparatus. Consequently, the simulation equivalent to the transaction of the client as a simulation target for the server is executed in a real-time manner, the operating state is displayed on a monitor in a real-time manner and is recorded into a performance log file, a propriety of the operation in the system is verified on the basis of the display and recording of the operating state, so that the system performance can be correctly evaluated.

The above and other objects, features, and advantages of the present invention will become more apparent from the following detailed description with reference to the drawings.

BRIEF DESCRIPTION OF THE DRAWINGS

FIGS. 1A and 1B are explanatory diagrams of a server client system to which the invention is applied;

FIG. 2A and 2B is a functional block diagram of an embodiment of the invention;

DETAILED DESCRIPTION OF THE PREFERRED EMBODIMENTS

FIG. 1A shows an example of a computer network in which a simulator apparatus of the invention is used and relates to an example of a server client system. In FIG. 1A, a server 12 and clients 14-1 to 14-4 are connected to a local area network (hereinbelow, referred to as an "LAN") 10 as a transmission line. As an LAN 10, for example, an internet protocol network (IP network) is used. Therefore, each of the server 12 and the clients 14-1 to 14-4 has an interface to support a TCP/IP conversion for the LAN 10. In order to evaluate a system performance of such a computer network, a simulator machine 16 of the invention is connected to the LAN 10. The simulator machine 16 collects communication information on the LAN 10, extracts communication information among the clients 14-1 to 14-4 for the server 12 from the collected communication information, discriminates the communication information necessary for the simulation on a unit basis of designated one or a plurality of protocols from the extracted communication information, and automatically forms the simulating procedure every protocol. The simulating procedure formed by collecting the communication information of the LAN 10 by the simulator machine 16 is performed in a manner such that a transaction according to the simulating procedure is executed between the simulator machine 16 and server 12 by using the simulator machine 16 as one or a plurality of pseudo clients, each operating state of the simulating procedure is recorded into a performance log file, and the operating state is displayed in a real-time manner, thereby evaluating the performance in the communicating operation between the server 12 and the clients 14-1 to 14-4.

FIG. 1B shows another embodiment of the invention. This embodiment is characterized in that two simulator machines 16-1 and 16-2 are provided. In this case, in addition to the simulator machine 16-1 itself, the machine 16-1 as a master designates the external simulator machine 16-2 and allows the machine 16-2 to perform the simulating operation, so that a multi-machine construction can be formed. Although FIGS. 1A and 1B have been described with respect to the examples in the case where one server 12 was connected to the LAN 10, a plurality of servers 12 can be also used.

Figure 2B:
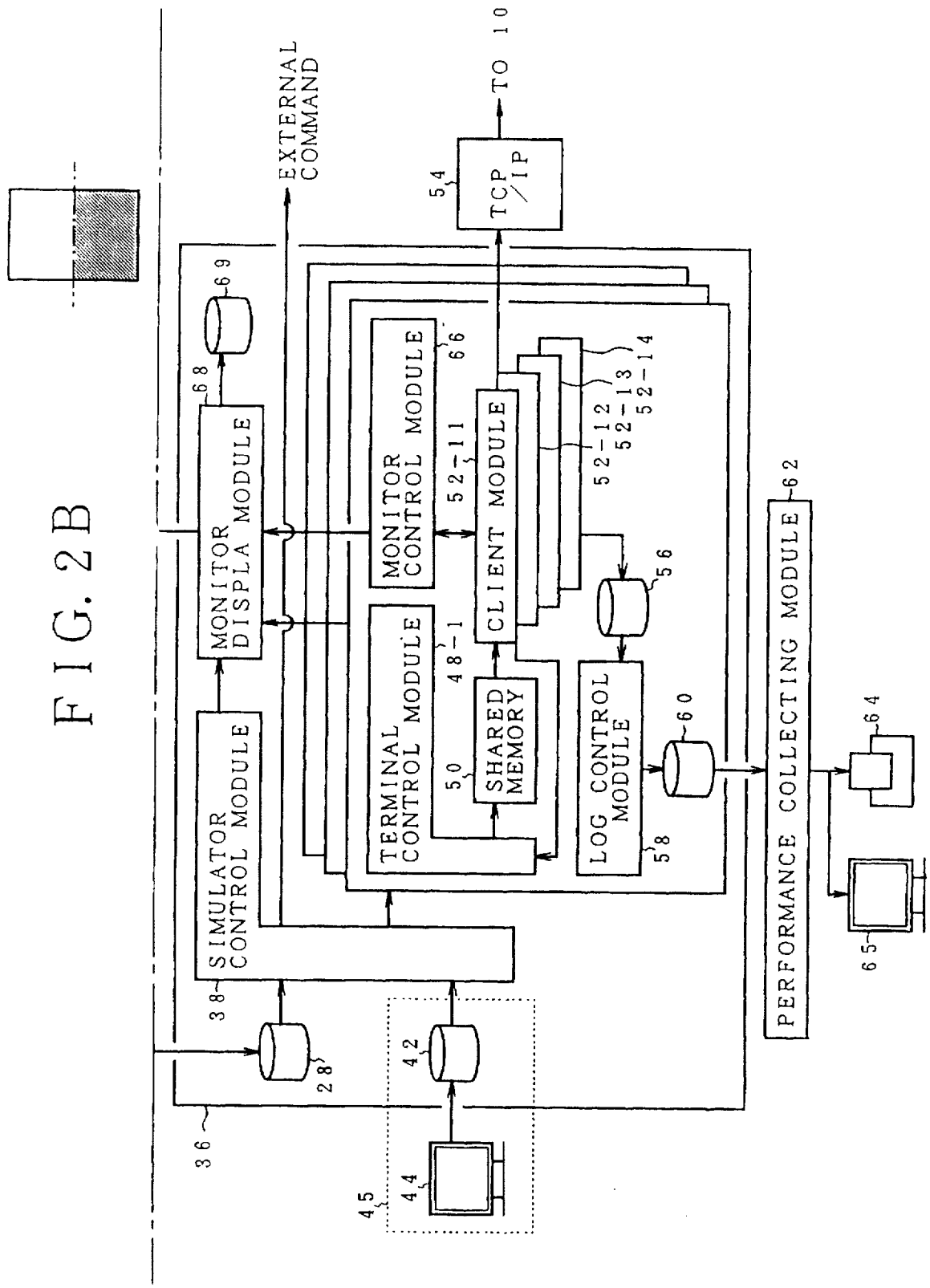

FIG. 2 is a functional block diagram of the simulator machine 16 in FIG. 1A. In FIG. 2, the simulator machine 16 of the invention is constructed by: a line information collecting module 18; an information extracting module 22; a procedure converting module 26; and a simulation processing module 36. Further, edition processing modules 30 are provided for the procedure converting module 26. The line information collecting module 18 collects all of the communication information on the LAN 10. That is, when a specific collecting time zone is set in the simulator machine 16 and the line information collecting module 18 is activated, all of the communication information transmitted on the LAN 10 is collected and stored to a communication record file 20 for such a time zone.

Figure 3:
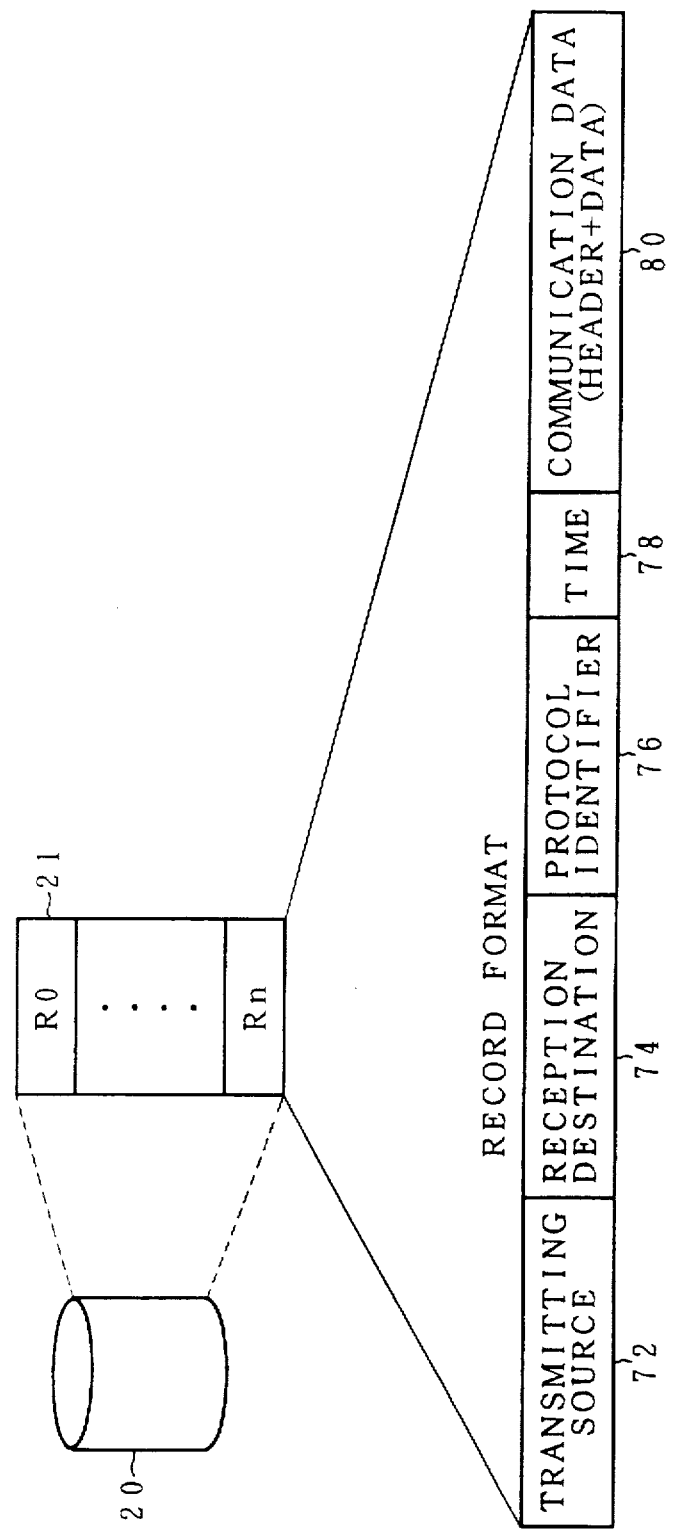
FIG. 3 is an explanatory diagram of a file structure and a record format of a communication record file in FIG. 2.

The communication record file 20 has a file structure and a record format in FIG. 3. Namely, since one communication information is transmitted as packet information on the LAN 10, one packet is made correspond to one record in a file structure 21 of the communication record file 20 and is recorded. A record format of each of records R0 to Rn indicative of the communication information of one packet in the file structure 21 includes: a transmitting source 72; a reception destination 74; a protocol identifier 76; a time 78; and communication data 80 constructed by a protocol header and data. In this instance, a peculiar protocol identifier is added to the protocol identifier 76 on a unit basis of a transaction which is transmitted and received between the server and client. For example, a combination of the port number of the transmitting source and the port number of the reception destination is used as a protocol identifier 76, so that it will be understood from the port numbers that the protocols are the same.

Referring again to FIG. 2, the information extracting module 22 provided subsequent to the line information collecting module 18 extracts necessary communication information between the server and the client on a unit basis of the designated protocol from the communication record file 20 obtained by the line information collecting module 18 as a target and stores to a communication record file 24. Ordinarily, since transactions by a plurality of different protocols are executed on the LAN 10, a plurality of protocols, for example, protocols A, B, and C are designated, thereby extracting the communication information. A file structure and a record format of the communication record file 24 are the same as those of the communication record file 20 in FIG. 3. There is only a different point between them that a name indicative of a state before the extraction and a name indicative of a state after the extraction are added as file names.

Figure 4:
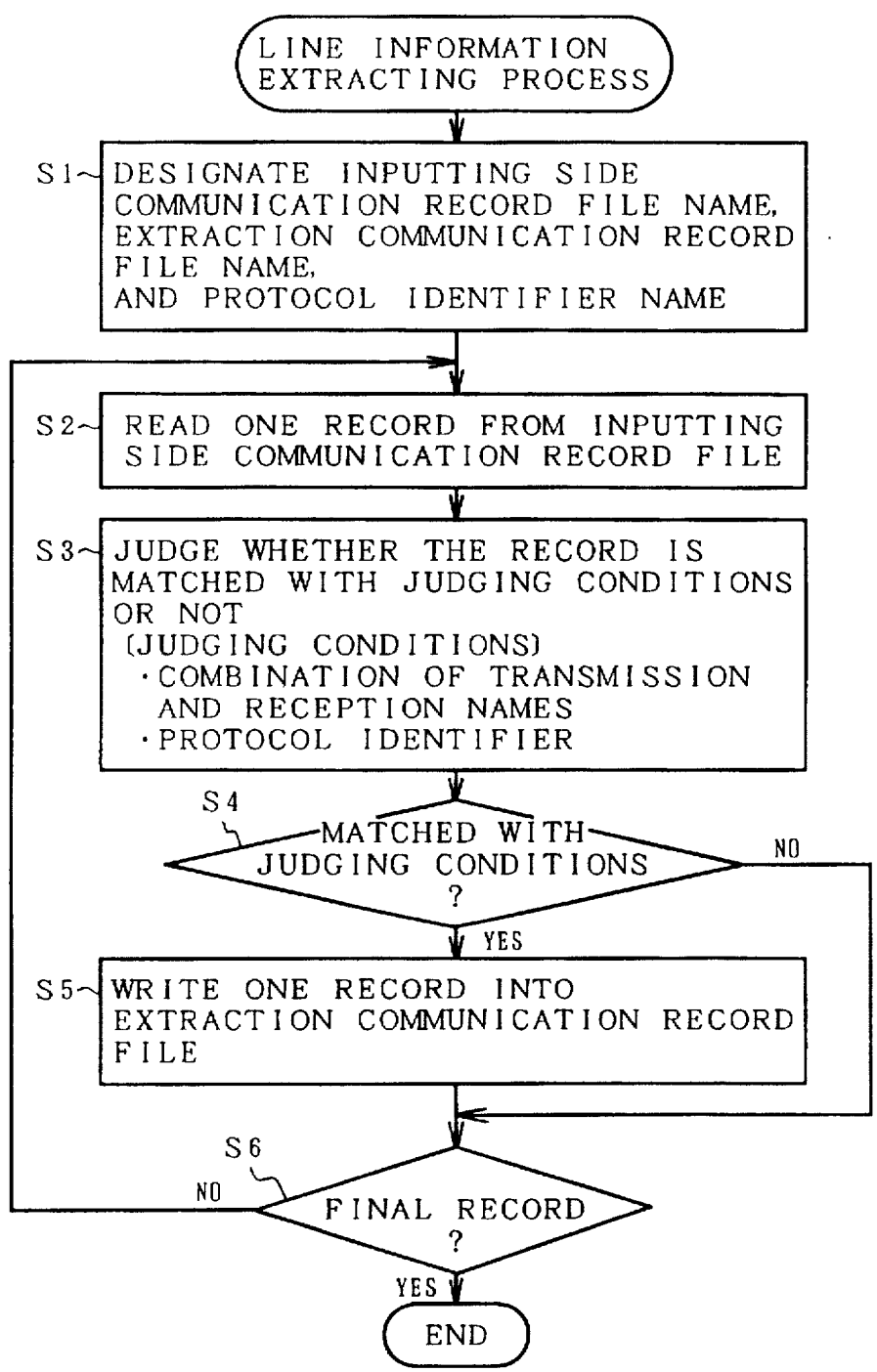
FIG. 4 is a flowchart for a processing operation by an information extracting module in FIG. 2.

A line information extracting process by the information extracting module 22 is as shown in a flowchart of FIG. 4. In step S1, a file name of the communication record file 20 formed by the line information collecting module 18 as an inputting side, a file name of the communication record file 24 serving as an extraction destination, and further, a name of the protocol identifier for specifying the server and client serving as extraction targets and the transaction contents are designated. Step S2 follows and one record at the head is read out from the communication record file 20 on the inputting side. In step S3, whether the record is matched with the set judging conditions or not is judged. In this instance, as judging conditions for extraction, two conditions such as combination of the transmission and reception names and protocol identifier are used. The combination of the transmission and reception names is a combination of the server name as a transmitting source and the client name as a reception destination. The protocol identifier indicates a specific transaction. In step S3, with respect to the record as a target to be processed at present, namely, the contents similar to the record format in FIG. 3, a check is made to see if the combination of the transmitting source 72 and reception destination 74 is matched with the judging conditions and the protocol identifier 76 is matched with the designated judging conditions. As a result of the judgment, when it is judged that they are matched with the judging conditions in step S4, step S5 follows and the record which is being processed at present is written into the communication record file 24 for extraction. When they are not matched with the judging conditions in step S4, the record is not written to the communication record file 24 serving as an extraction destination. In step S6, a check is made to see if the record is the final record. The processes in steps S2 to S5 are repeated hereinafter until the final record is read. By such a line information extracting process, the communication information having the combination of the transmission and reception names and the protocol identifier which were designated to simulate is sequentially extracted on a record unit basis and is stored into the communication record file 24.

Referring again to FIG. 2, since the embodiment has been described with respect to an example of three protocols A, B, and C, procedure converting modules 26-1, 26-2, and 26-3 are provided subsequent to the information extracting module 22 for every protocols A, B, and C. The procedure converting modules 26-1 to 26-3 form a simulating procedure file 28 having a procedure (command train) necessary for the simulation on a protocol unit basis.

Figure 5:
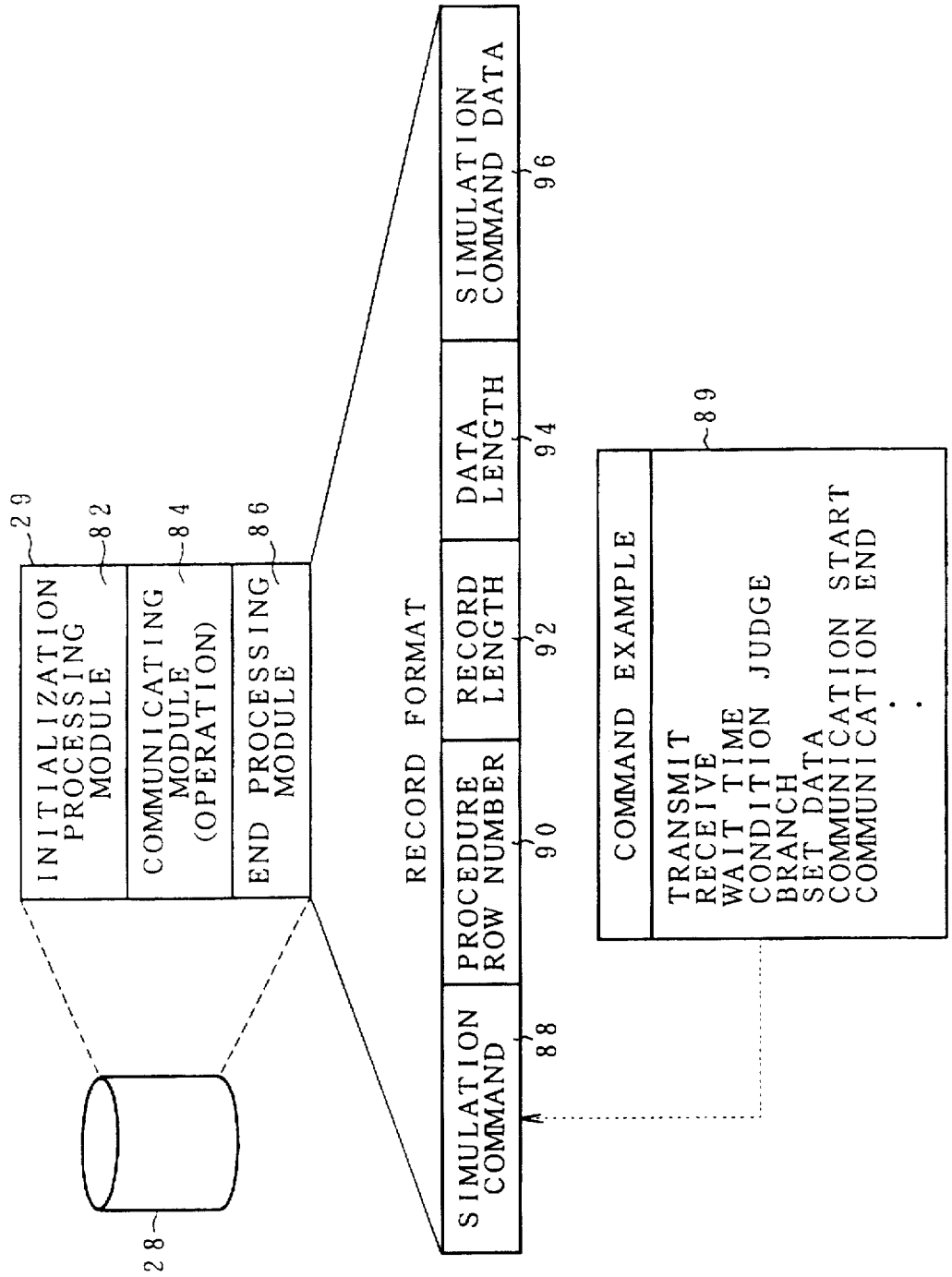
FIG. 5 is an explanatory diagram of a file structure and a record format of a simulating procedure file in FIG. 2.

The simulating procedure file 28 has the file structure and record format in FIG. 5. A file structure 29 of the simulating procedure file 28 is divided into an initialization processing module 82 for a simulation control constructed by one or a plurality of records, a communicating module 84 (operating module), an end processing module 86. The record format is constructed by: a simulation command 88; a row number 90; a record length 92; a data length 94; and simulation command data 96. As shown by extracting a command example 89, there are commands such as "transmit", "receive", "wait time", "condition judge", "branch", "set data", "communication start", "communication end", and the like as simulation command 88. The contents of the communicating module 84 in the file structure 29 of the simulating procedure file 28 are formed on the basis of the extraction result of the communication information collected from the transmission line. That is, the head initialization processing module 82 is a simulation initializing process to perform the simulation control. As for the next communicating module 84, the procedure of the communicating operation which was collected from the line and was actually executed is written on a record unit basis between the head simulating communication start module and the last simulating communication end module. The last end processing module 86 is a record area for the simulation end processing operation. The processing operation of the procedure converting module 26 in FIG. 2 for converting such a simulating procedure file 28 is executed as shown in a flowchart of FIG. 6.

Figure 6:
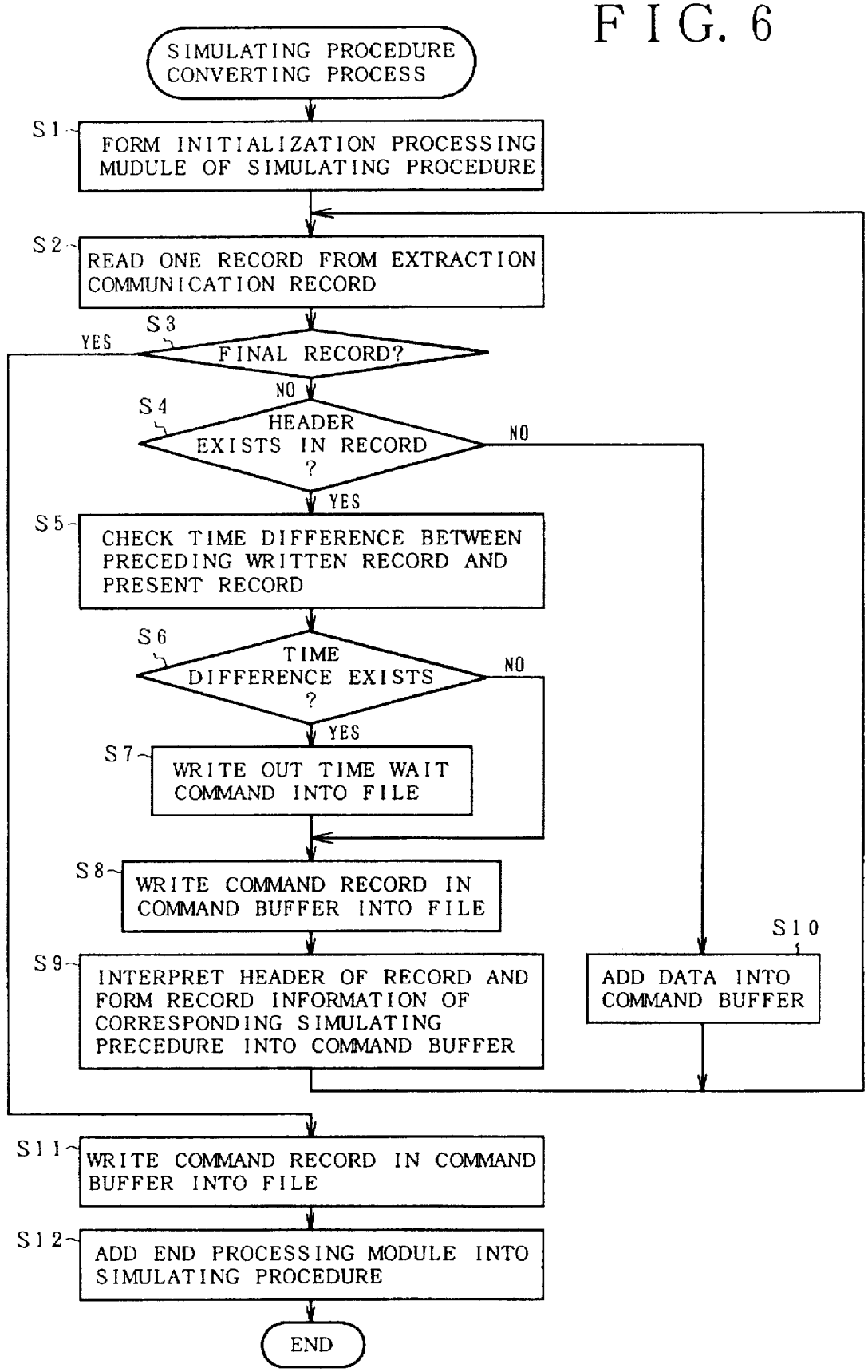
FIG. 6 is a flowchart for a forming process of a simulating procedure by a procedure converting module in FIG. 2.

In the simulating procedure converting process in FIG. 6, first in step S1, the initialization processing module 82 shown in the file structure 29 in FIG. 5 is formed. When the initialization processing module is formed, in step S2, one record at the head is read out from the communication record file 24 which was formed and extracted by the information extracting module 22. A check is made in step S3 to see if it is the final record. After that, step S4 follows and a check is made to see whether a header exists in an area of the communication data 80 in the record format in FIG. 3 or not. If YES, step S5 follows and a time difference between the preceding written record and the present read record is checked. When a time difference exists, step S7 follows and a time wait command is written out into the file. When there is no time difference, step S8 follows and the command record which has been formed in a command buffer so far is written into the file. Subsequently, step S9 follows and a header of the record which is being processed at present is interpreted and the record in which the record information of the corresponding simulating procedure, for example, the simulation command such as "communication start", "transmit", "receive", "communication end", and the like has been stored is formed in the command buffer. On the other hand, in the case where no header exists in the record in step S4 and only data exists, step S10 follows and the data is added to the command buffer. The above-mentioned processes in steps S2 to S10 are repeated until the final record is discriminated in step S3. When the final record is discriminated, the processing routine advances to step S11 and the command record formed lastly in the command buffer is stored into the file. In step S12, the end processing module is added to the simulating procedure file. That is, the end processing module 86 in the file structure 29 in FIG. 5 is added. A series of forming processes of the simulating procedure file are finished. The simulating procedure file 28 formed on a protocol unit basis by the procedure converting modules 26-1 to 26-3 in FIG. 2 is provided for the simulation processing module 36, so that the simulating operation of the client for the server according to the simulating procedure file 28 can be executed.

The contents of the simulating procedure file 28 formed by the procedure converting modules 26-1 to 26-3 in FIG. 2 can be changed by using edition processing modules 30-1 to 30-3 provided every protocol. As representatively shown by the edition processing module 30-1, each of the edition processing modules 30-1 to 30-3 is constructed by a file converting module 31, a text file 32, and an editor 34 for edition. Since the file format of the simulating procedure file 28 has a binary format which cannot be recognized by the user, the file converting module 31 converts the file format to a text format which can be recognized by the user and stores into the text file 32. The file converting module 31 also has a function of a reverse conversion for returning the file format of the text file 32 to the original binary format. The user can execute necessary correction and change of the simulating procedure file of the text format converted to the text file 32 as a target by using the editor 34.

Figure 7:
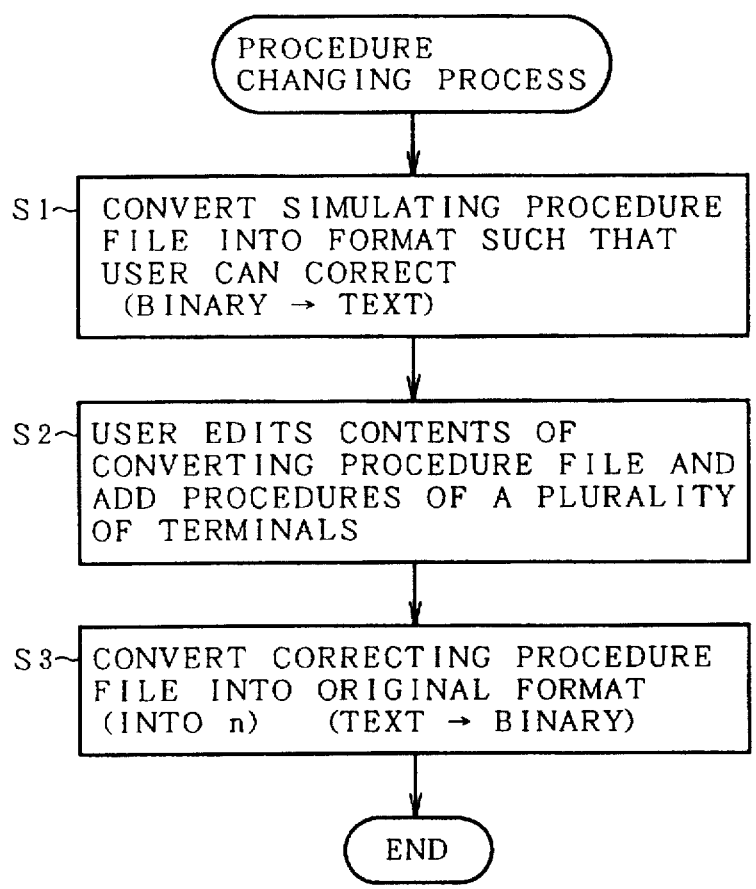
FIG. 7 is a flowchart for a changing process of a simulating procedure by an edition processing module in FIG. 2.
Figure 8:
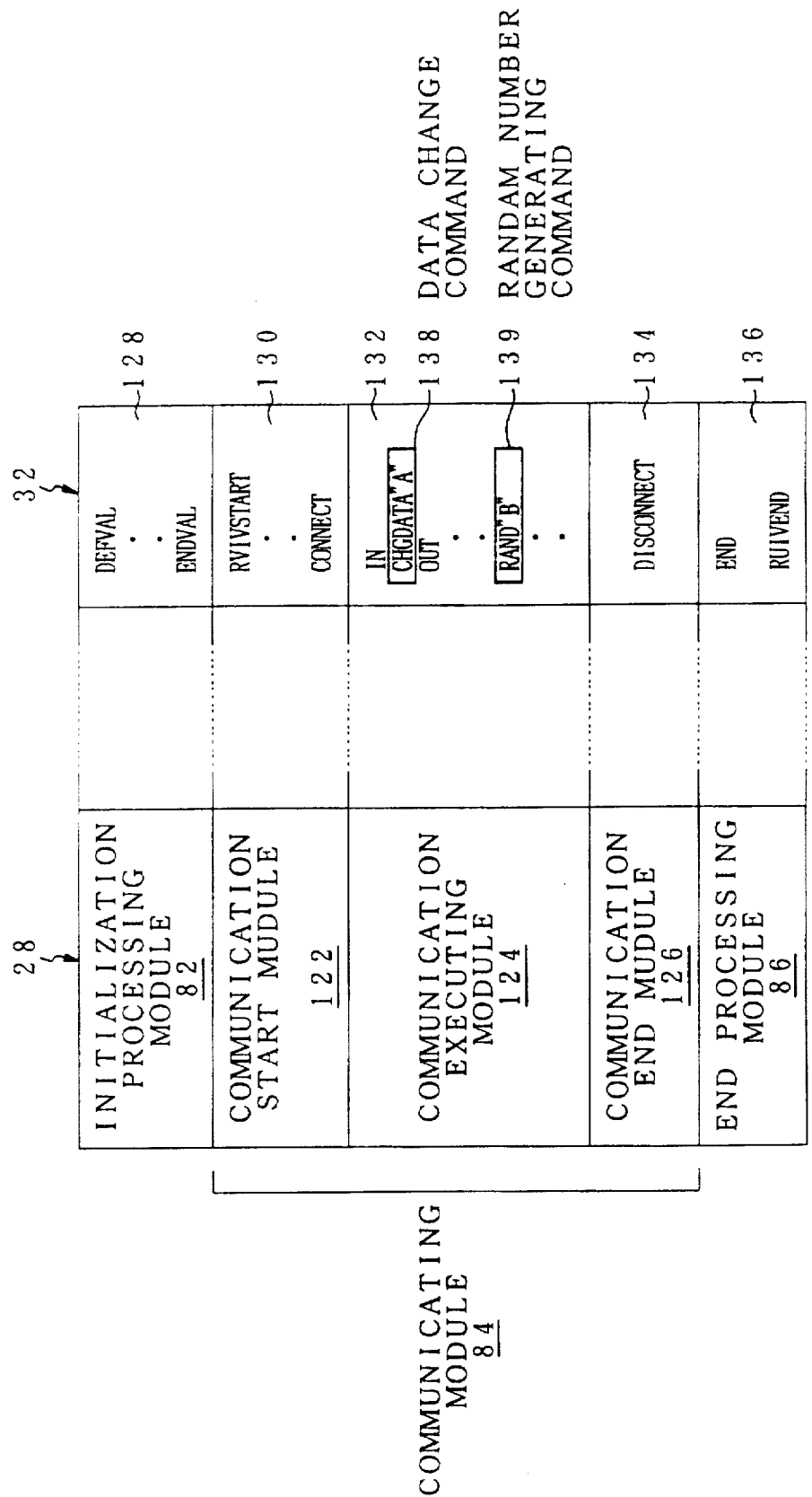
FIG. 8 is an explanatory diagram of a conversion of a file format and a correction of a procedure by the user in FIG. 7.

FIG. 7 is a flowchart for the simulating procedure changing process by the edition processing modules 30-1 to 30-3. In step S1, the simulating procedure file is converted to the binary format which can be corrected by the user. In step S2, an editing process is executed, thereby returning to the original text format in step S3. FIG. 8 shows a corresponding relation between the simulating procedure file 28 and the text format file 32. As shown in the file structure 29 in FIG. 5, the simulating procedure file 28 is constructed by the initialization processing module 82, communicating module 84, and end processing module 88. The communicating module 84 has a communication start module 122 and a communication end module 126 for simulation before and after the module 84. A communication executing module 124 describing the executing procedure based on the communication information collected from the line is provided between the modules 122 and 126. The simulating procedure file 28 having such a binary format is converted to the text format file 32 shown on the right side by the file converting module 31 provided for the edition processing module 30-1 in FIG. 2, so that the user can recognize the file contents by the editor 34. In correspondence to the simulating procedure file 28, the text file 32 is also constructed by: an initialization processing module 128; a communication start module 130; a communication executing module 132; a communication end module 134; and an end processing module 136. The text file 32 is described in the text format shown in the diagram. The editing process using the text format file 32 forms the original simulating procedure file 28, namely, the simulating procedure file for simultaneously performing the operations of a plurality of clients, thereby allowing the communicating operation of n:1 to be executed between the plurality of clients and the server. In order to make the plurality of clients operative by using the same simulating procedure, for example, as shown in FIG. 8, the user provides (CHGDATA "A") as a data change command 138 or (RAND "B") as a random number generating command 139 into the communication executing module 132 for the text format file 32. By providing such a data change command 138 or random number generating command 139, the simulation for communicating different data although the procedure is the same each time the client which falsely operates is changed can be realized. The corrected text format file 32 is returned to the original simulating procedure file 28 by the reverse conversion by the file converting module 31. Therefore, the simulating procedure file 28 for making the n clients operative for one server can be easily formed. The edition processing module 30 in FIG. 2 can form not only the simulating procedure file for simulating the n clients for the server but also the simulating procedure file which was properly modified by correcting the contents for the original simulating procedure file 28 by designating a different file name upon edition.

The simulation processing module 36 in FIG. 2 will now be described. The simulation processing module 36 is constructed by a simulator control module 38 and group control modules 46-1, 46-2, and 46-3 which are formed every transaction unit. The transaction units for forming the group control modules 46-1 to 46-3 correspond to the three simulating procedures converted, for example, every protocols A, B, and C. Even in the same protocol, since the plurality of different transactions are included in the protocol, there is also a case where a plurality of group control modules are provided for the single protocol. A case where the group control modules 46-1 to 46-3 are formed in correspondence to the three simulating procedures converted on a protocol unit basis will now be described as an example. The simulating procedure file 28 of every protocol converted by the procedure converting module 26 or edition processing module 30 is provided for the simulator control module 38. A simulation definition file 42 formed by a simulator defining module 45 is further provided.

Figure 9:
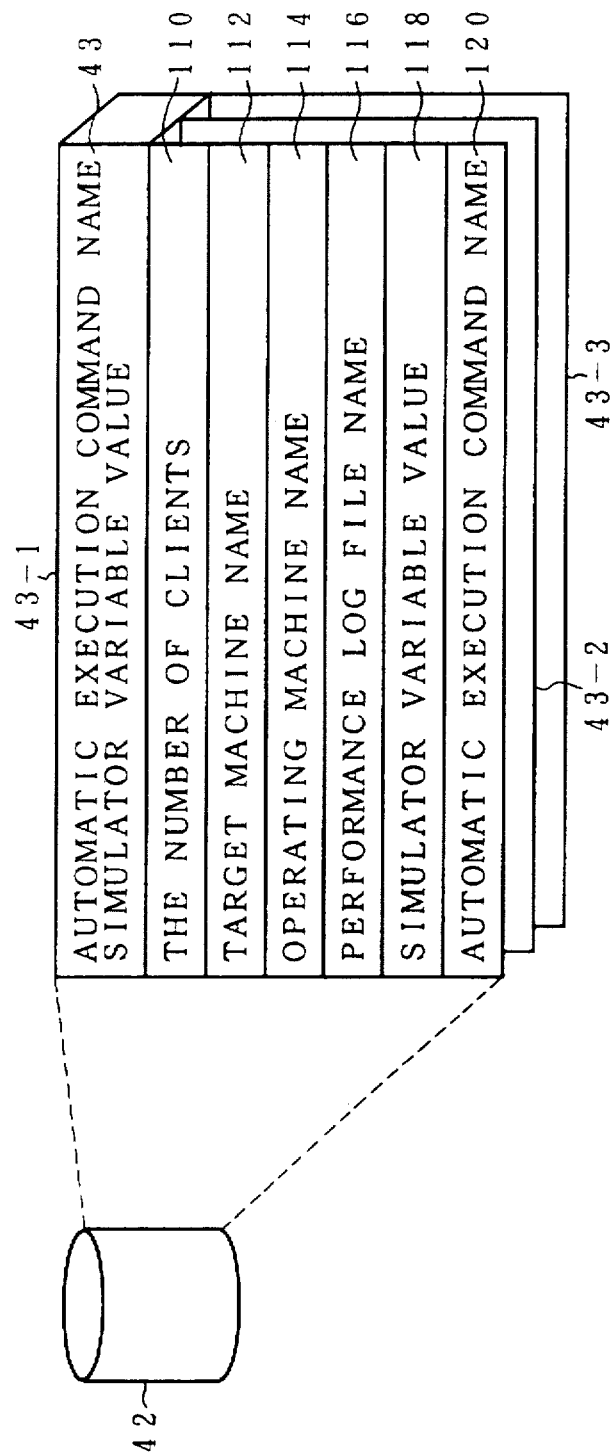
FIG. 9 is an explanatory diagram of a file structure of a definition file of the simulating operation in FIG. 2.

As shown in FIG. 9, the simulation definition file 42 has a file structure constructed by a common portion file 43 and transaction unit files 43-1 to 43-3. In the common portion file 43, items which are defined irrespective of the transaction under the domination of the simulator, for example, an automatic execution command name and a simulator variable value are defined. In the transaction unit files 43-1 to 43-3 provided on a transaction unit basis as shown by the file structure 43-1 as a representative example, the number of clients 110 serving as transmitting source units in the simulating operation by the simulation, a target machine name 112 of the server serving as a reception destination unit in the simulating operation, an operating machine name 114 of the simulator machine 16 for executing the simulating operation, a performance log file name 116, a simulator variable value 118, and an automatic execution command name 120 are defined by an editor 44. In this instance, as an operating machine name 114, the machine name of the simulator machine 16 of the invention is designated in case of FIG. 1A. In case of the multi-machine construction in FIG. 1B, the machine name of the external simulator machine 16-2 is designated in addition to the self machine name. In this instance, the automatic execution command is a command which is used to access (activation, stop) to the application programs other than the simulator program which realizes the simulator apparatus of the invention. As an issue destination of the automatic execution command, an OS and other application programs of the simulator machine 16 and an OS and other application program of the server 12 are set. The issue timing and processes of the automatic execution command will be obviously explained hereinlater.

The simulator control module 38 in FIG. 2 designates any one of a plurality of simulating procedure files 28 and forms, for example, the group control modules 46-1 to 46-3 on a transaction unit basis in accordance with the simulation definition file 42. As shown in the group control module 46-1 as a representative example, each of the group control module 46-1 to 46-3 has a terminal control module 48, a shared memory 50, and client modules of the number designated by the simulation definition file 42, for example, four client modules 52-11 to 52-14. Each of the client modules 52-11 to 52-14 executes a communication control with the LAN 10 by a TCP/IP conversion through a communication interface 54. The group control module 46-1 further has a monitor control module 66, so that operating statuses of the client modules 52-11 to 52-14 can be displayed on a display monitor 70 in a real-time manner by a monitor display module 68 as a common portion and monitor information can be recorded to a monitor log file 69. Further, the group control module 46-1 has a log control module 58. The log control module 58 records the procedure and the operation to a performance log file 60 on the basis of the contents of an operation record file 56 of a client module unit obtained by the execution of the communicating operation in the client modules 52-11 to 52-14. The performance log file 60 has a performance collecting module 62 in the outside. The performance collecting module 62 collects and analyzes transaction, response, transaction number, and the like on the basis of the log information recorded in the performance log file 60, thereby enabling them to be outputted to a printer 64 and be displayed on a display monitor 65.

Figure 10:
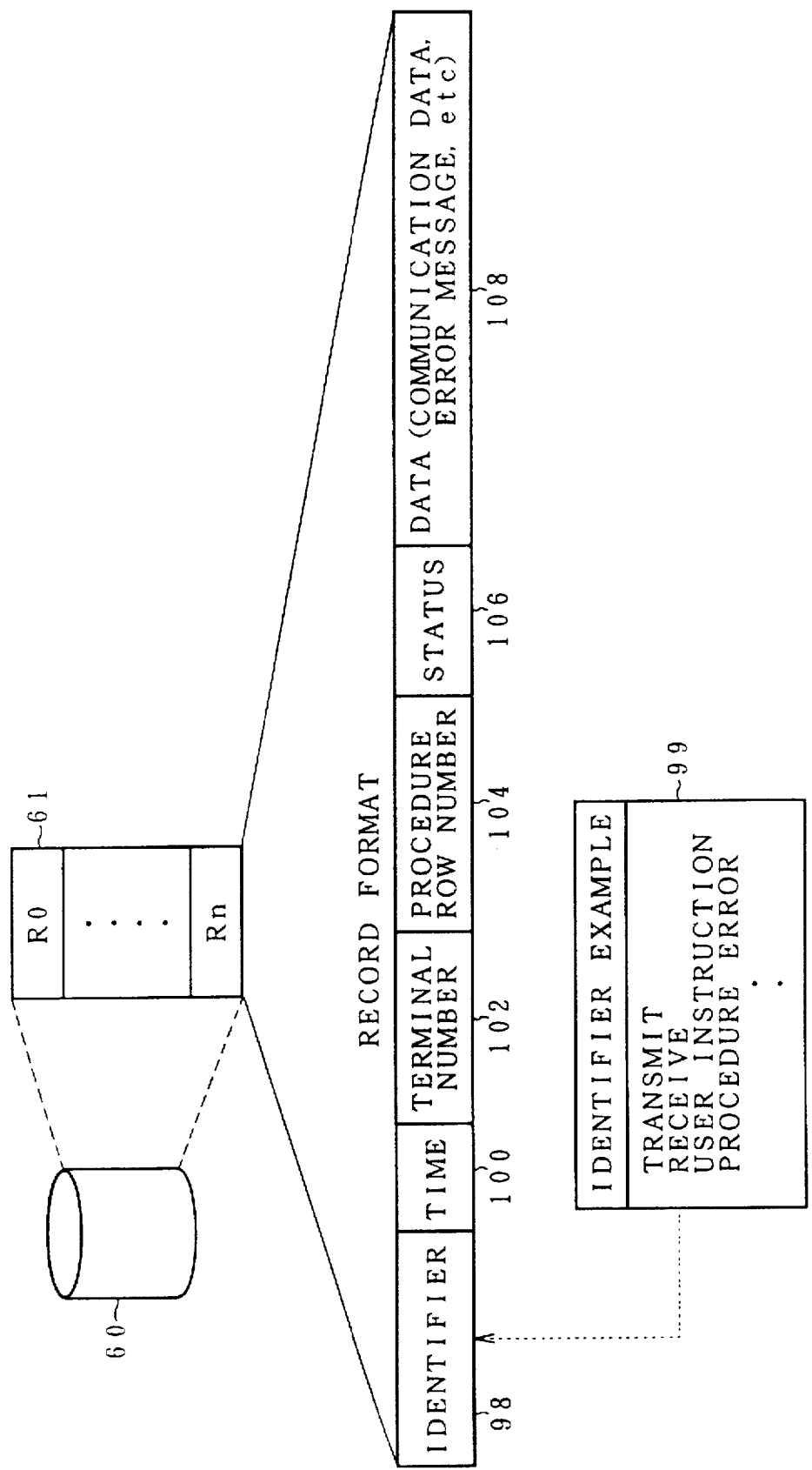
FIG. 10 is an explanatory diagram of a file structure and a record format of a log file which is used to evaluate a performance in FIG. 2.

A file structure and a record format of the performance log file 60 are shown in FIG. 10. The performance log file 60 records the records R0 to Rn shown in a file structure 61. Each record is constructed by: an identifier 98; a time 100; a client number 102; a procedure row number 104; a status 106; and data 108 such as communication data, error message, and the like. The identifier 98 at the head indicates communication contents of each of "transmit", "receive", "user instruction", "procedure error", and the like as shown in an identifier example 99.

Figure 11:
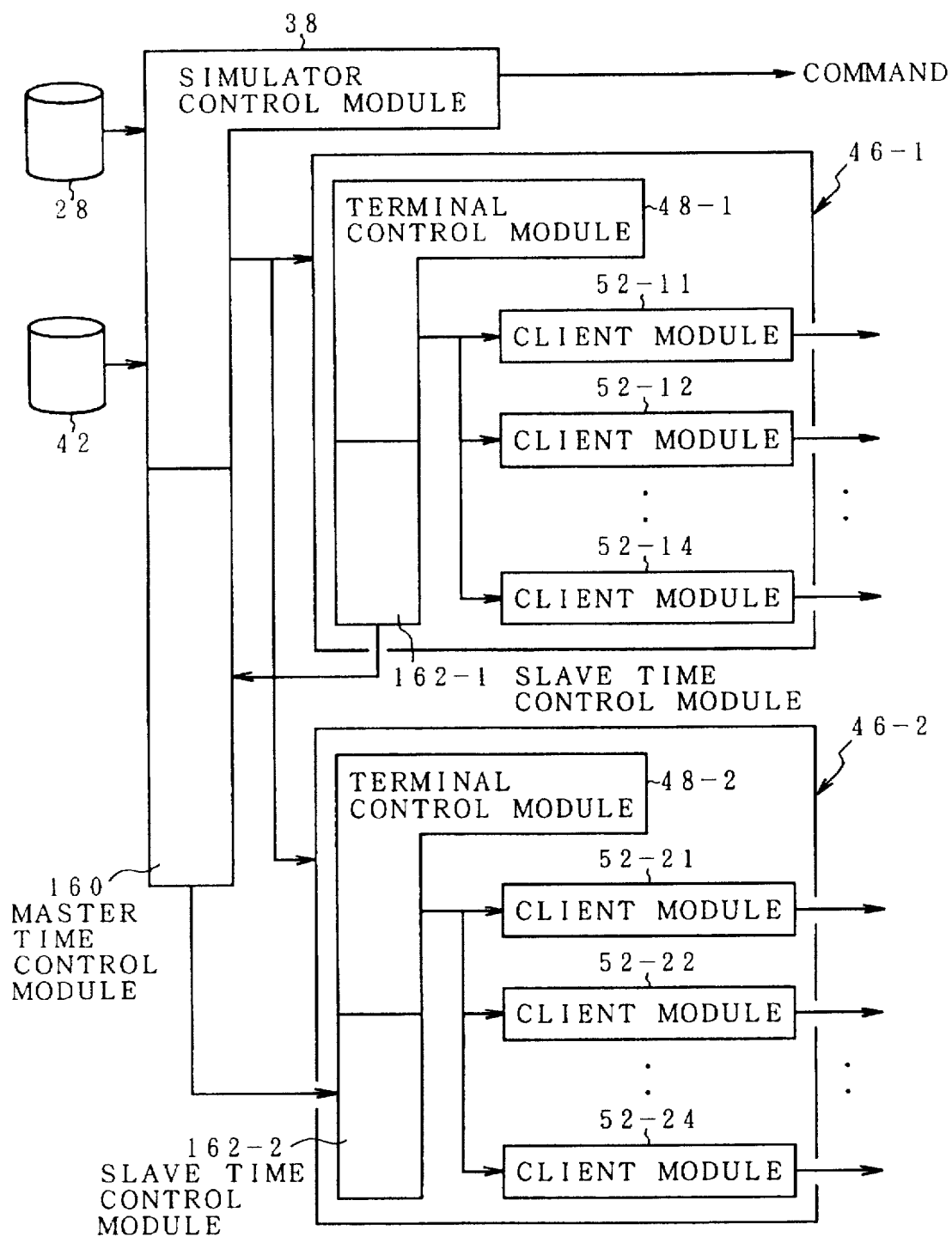
FIG. 11 is a functional block diagram of a group control module by a simulation processing module in FIG. 2.

Details of the simulation processing module 36 in FIG. 2 are shown in FIG. 11. In FIG. 11, two group control modules 46-1 and 46-2 are formed on a transaction unit basis for the simulator control module 38. Forming locations of the group control modules 46-1 and 46-2 are decided by the operating machine name 114 in the file structures 43-1 and 43-2 of the transaction unit of the simulation definition file 42 in FIG. 9. When the operating machine name 114 is set to the simulator machine 16 as shown in FIG. 1A, the group control modules 46-1 and 46-2 are formed in the simulator machine 16. As shown in FIG. 1B, in the case where the operating machine name of the file structure 43-1 is set to the simulator machine 16-1 and the operating machine name of the file structure 43-2 is set to the external simulator machine 16-2, the group control module 46-2 is formed in the external simulator machine 16-2 designated from the simulator machine 16-1 and is activated. In this case, the group control modules 46-1 and 46-2 are executed in the multi-machine construction.

The simulator control module 38 is a common control module for the two group control modules 46-1 and 46-2 formed according to the simulation definition file 42. The simulator control module 38 generates a command defined by the automatic execution command in the transaction unit files 43-1 to 43-3 in the file structure of the simulation definition file 42 in FIG. 9 in accordance with the operating situations of the group control modules 46-1 and 46-2 and manages the simulation as a whole system. In this instance, when the group control module 46-2 is formed in the simulator machine 16-2 in the outside, the simulator control module 38 of the simulator machine 16-1 manages the simulating operation of the external simulator machine 16-2 through the LAN 10 by the multi-machine construction of FIG. 1B. In this case, the simulator machine 16-1 operates as a master and the external simulator machine 16-2 operates as a slave.

Figure 12:
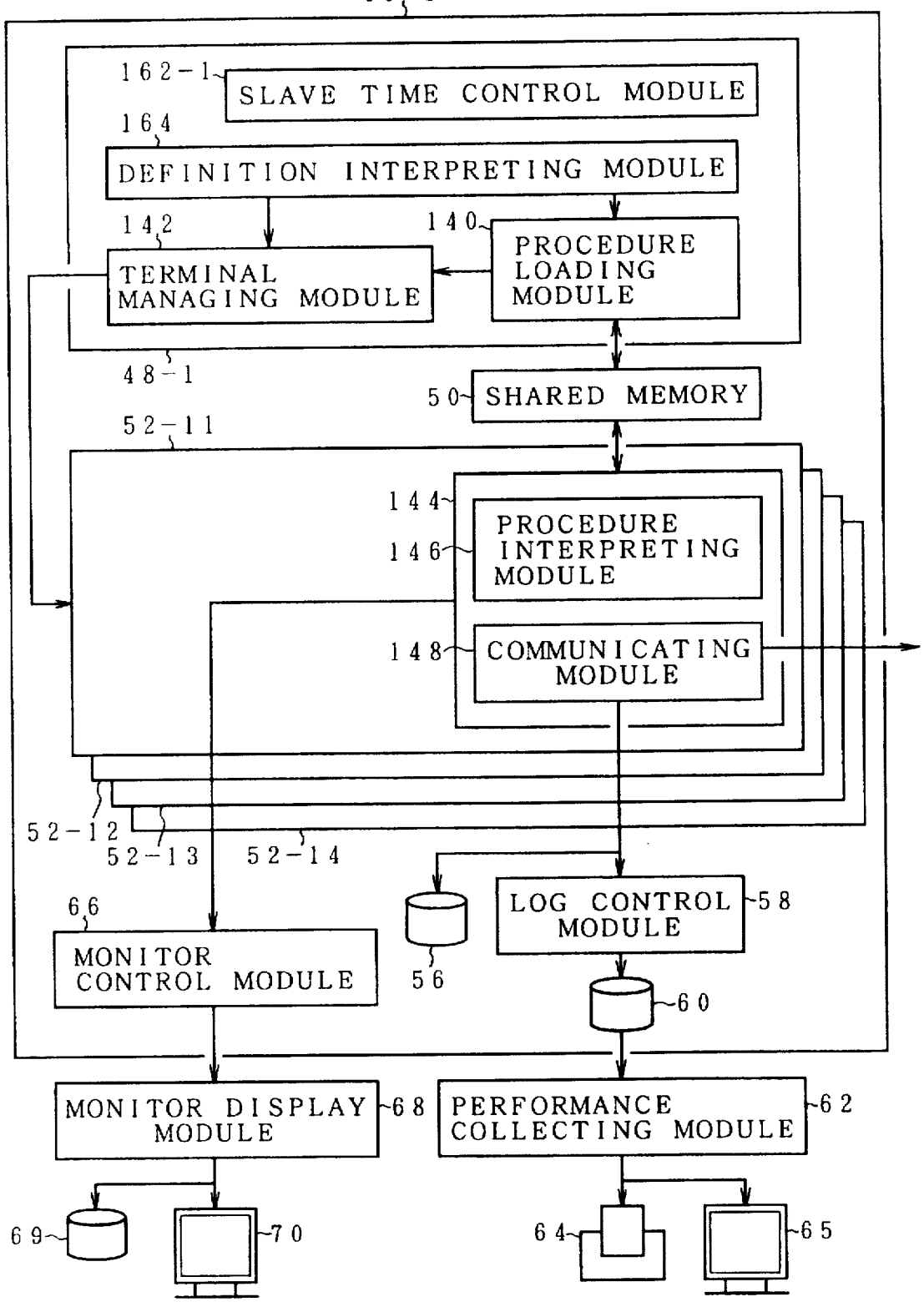
FIG. 12 is a block diagram showing the details of a group control module in FIG. 11.

FIG. 12 shows the details of the group control module 46-1. A definition interpreting module 164 captures the shared memory 50 on the basis of the information of the simulating operation definition file designated at the time of the formation of a terminal control module 48-1 and requests a procedure loading module 140 to load the simulating procedure. In the procedure loading module 140, the simulating procedure designated at the time of the formation of the group control module 46-1 is interpreted and a series of procedures based on the interpretation result, a simulator variable value defined by the simulation definition file, and the like are loaded. A terminal managing module 142 forms the client modules 52-11 to 52-14 necessary for the simulation by an instruction of the definition interpreting module 164. In the client modules 52-11 to 52-14 formed by the terminal managing module 142 of the terminal control module 48-1, as shown in the client module 52-11 as a representative example, an executing module 144 is provided. The executing module 144 has a procedure interpreting module 146 and a communicating module 148. The procedure interpreting module 146 reads the operating procedure loaded in the shared memory 50, interprets a read procedure command, and calls necessary processes, thereby allowing, for example, the communicating module 148 to perform the communicating operation. The operating status in association with the execution of the procedure command of the communicating module 148 is provided to the log control module 58 and the procedure command and the operating status are recorded into the performance log file 60. The procedure command and operating status of the executing module 144 are sent to the monitor control module 66 and are displayed on the display monitor 70 in a real-time manner by the monitor display module 68. The contents of the monitor display can be recorded to the monitor log file 69 as necessary. At the same time, depending on the procedure command, the operating situation is provided to the log control module 58 and the procedure command and operating status are recorded into the performance log file 60. In this instance, when a data amount increases to an enormous amount due to the simulation for a long time, simulations of many clients, or the like, the operation record file 56 provided for each of the client modules 52-11 to 52-14 records the procedure command and the operating status of every client module to the operation record file 56. After that, the log control module 58 extracts necessary information from the operation record file 56 by a batch process and records into the performance log file 60.

Figure 13:
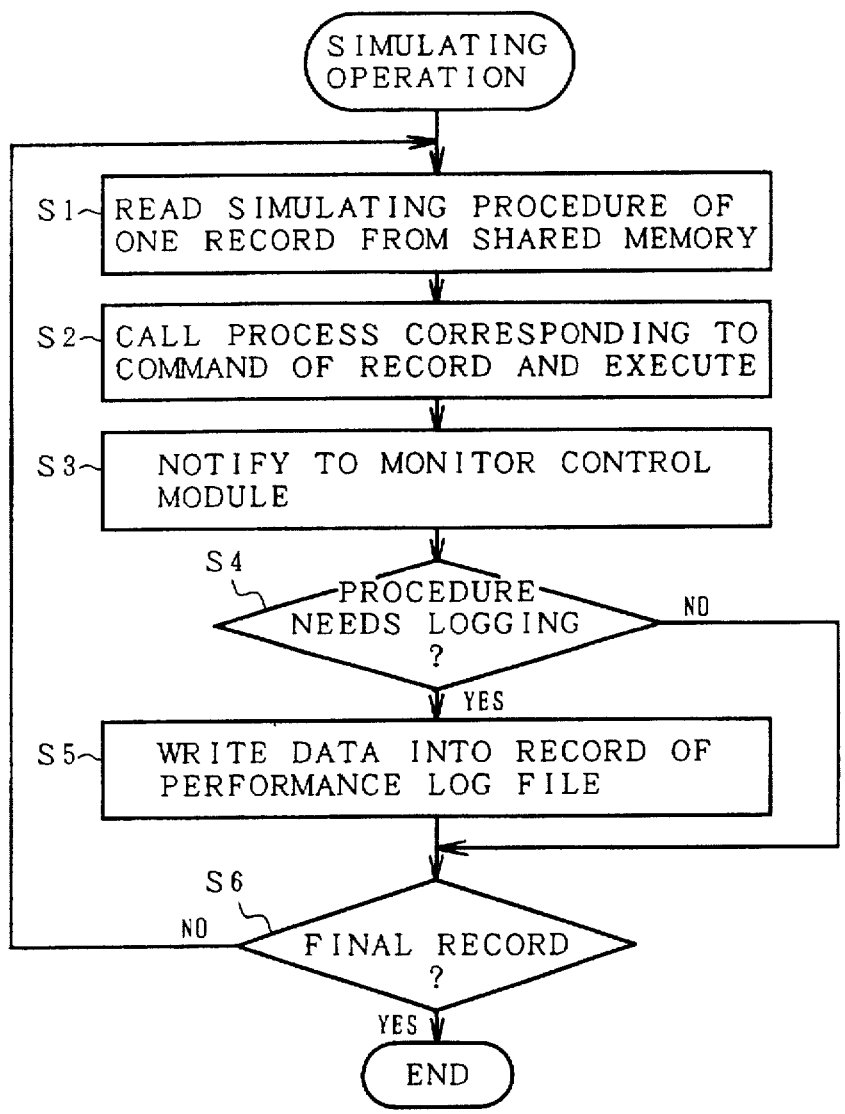
FIG. 13 is a flowchart of a simulating operation by a client module in FIG. 12.

A flowchart of FIG. 13 shows the simulating operation of the client module 52-11 in FIG. 12. First in step S1, the simulating procedure of one record is read out from the shared memory 50 and supplied to the procedure interpreting module 146. In step S2, the process corresponding to the command of record is called and the communicating operation is executed in, for example, the communicating module 148. Subsequently in step S3, the procedure command and the executing status are notified to the monitor control module 66. The monitor display module 68 receives information from the monitor control module 66 and displays information regarding the operating status of the simulation, an elapsed time, the number of transactions, an occurrence of errors, and the like on the monitor. In step S4, a check is made to see if the procedure command and operating status needs a log recording. If YES, the data of the procedure command and operating status is provided to the log control module 58 in step S5 and is written as log information to the performance log file 60. The processes in steps S1 to S5 are repeated until the final record is obtained in step S6.

FIGS. 14A to 14D show specific examples and timings of the automatic execution command defined by the simulation definition file 42 in FIG. 10. The simulator control module 38 generates a command at the timing designated by the definition of the automatic execution command in accordance with the operating situations of the client modules in the group control modules 46-1 and 46-2. The operating location of the command generated is any one of the simulator machine itself, another simulator machine connected by the line, server, and the like.

Figure 14A:
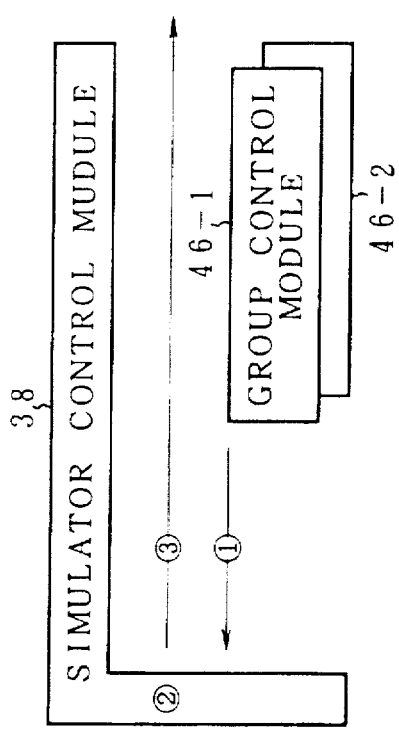
FIGS. 14A to 14D are explanatory diagrams of specific examples and timings of an automatic executing command which is used in the invention.

FIG. 14A shows an example when the simulation is started and the procedure is as follows.
(1) The simulation start command is generated and executed.
(2) The group control modules 46-1 and 46-2 are activated.
(3) An activation completion notification is received from the group control modules 46-1 and 46-1.

Figure 14B:
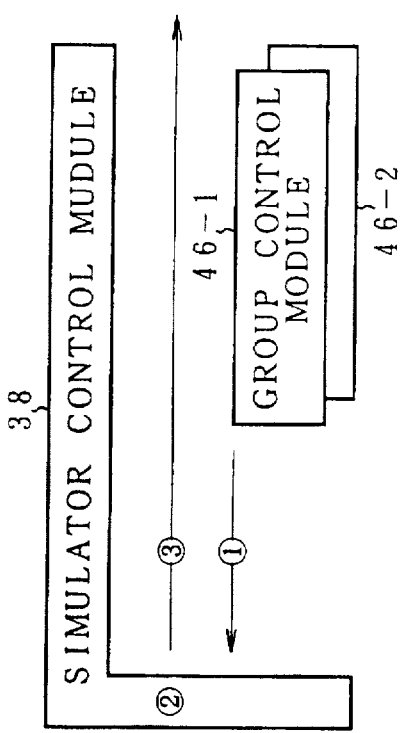

FIG. 14B shows an example when the communication is started and the procedure is as follows.
(1) The group control modules 46-1 and 46-2 are activated. Each client module in the group control modules 46-1 and 46-2 notifies the communication status command just before the communication start operation will be executed.
(2) Notifications from all of the activated group control modules 46-1 and 46-2 are waited.
(3) The communication start command is generated and executed.

Figure 14C:
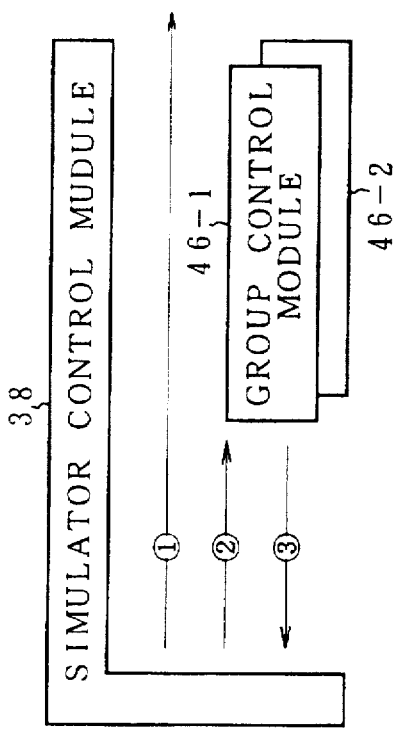

FIG. 14C shows an example when the communication is finished and the procedure is as follows.
(1) Any one of the client modules of the group control modules 46-1 and 46-2 notifies the communication end status after the communication end operation was executed.
(2) When there is at least one execution end notification of the communication end operation, the communication end command is generated and executed.

Figure 14D:
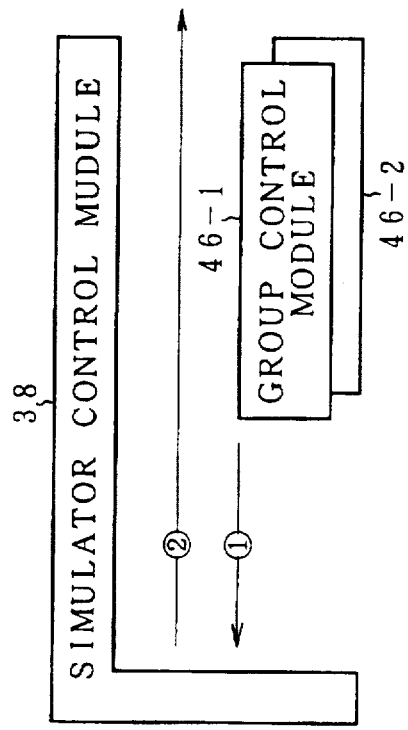

FIG. 14D shows an example when the simulation is finished and the procedure is as follows.
(1) Each of the group control modules 46-1 and 46-2 performs an end notification.

(2) The end notifications of all of the group control modules 46-1 and 46-2 are received.

(3) A simulation end command is generated and executed.

The procedures have been described above with respect to the examples of the activation timings of a fundamental automatic execution command which is used for the simulation. In this instance, as commands to be executed, for example, there are an activation command of the application program on the server 12, a command for logging information regarding the operating situation, a command for finishing the application program, and the like.

Referring again to FIG. 11, a master time control module 160 is provided for the simulator control module 38. The master time control module 160 receives time information from the server 12 serving as a partner destination of the simulating operation by the client modules 52-11 to 52-24 and temporarily matches the time of the server 12 with a time of the master time control module 160 of the simulator machine 16, thereby making the time information coincide with that of the server 12. Slave time control modules 162-1 and 162-2 are provided for the terminal control modules 48-1 and 48-2 which are provided in correspondence to the master time control module 160, respectively. The master time control module 160 transmits the time information to the slave time control modules 162-1 and 162-2 of the terminal control modules 48-1 and 48-2 and matches the time on the slave side with the time on the master side, thereby making coincide the time information of the simulating operation. Further, in case of the multi-machine construction of FIG. 1B, the simulator machine 16-2 side is used as a slave time control module for the master time control module 160 in FIG. 11 in the simulator machine 16-1. The time information is matched with the simulator machine 16-1 on the master side.

According to the invention as mentioned above, by merely connecting the simulator apparatus of the invention to the computer network whose performance should be evaluated, communication information between specific apparatuses can be extracted on a protocol unit basis, the simulating procedure can be automatically formed, the formation of the simulating procedure which has been formed from the beginning, hitherto, is not needed, and the simulating procedure can be remarkably easily formed. Since the simulating procedure is formed from the actual communication information which is executed in the computer network, the simulation which is equivalent to the actual communicating operation can be simply executed, so that a system performance evaluation such as a response or the like corresponding to the actual situation of the computer network can be verified by the simulation. Further, by changing the original simulating procedure formed from the communication information on the line, the simulating procedure of 1:n between the server and a plurality of clients can be easily formed. Moreover, the simulating operation which is matched with the actual situation can be easily realized by a proper combination such as multi-protocol and a plurality of transactions by simultaneously using a plurality of simulating procedures obtained on a protocol unit basis. The system performance of the server and clients, host and terminals, and the like can be properly evaluated.

The above embodiments have been described with respect to the case of simulating the transactions between the server and clients as targets as an example. In the computer network having a host computer which is used by a plurality of terminal machines as well, similarly, the simulator machine 16 of the invention is connected, the simulating procedure of a protocol unit is formed by extracting communication information for the host from the terminal, the simulating operation is similarly performed, so that an access of the terminal to the host is simulated and the performance can be evaluated. According to the above embodiments, although the case where the operation of the client is simulated by the simulator machine has been described as an example, the operation of the server can be also simulated on the contrary.

What is claimed is:

1. An apparatus for simulating a computer network system to which a plurality of units are connected through a transmission line and which performs a communicating process between an arbitrary transmitting source unit and a reception destination unit in accordance with a predetermined communication protocol, comprising:

a line information collecting module collecting communication information on said transmission line and storing said communication information into a first communication recording file;

a communication information extracting module extracting communication information matching a predetermined transmitting source, a reception destination, and a protocol identifier indicative of transaction contents from the communication information collected by said line information collecting module and stored in said first communication recording file, and storing said extracted communication information into a second communication recording file;

a procedure converting module determining the communication information necessary for a simulation which is matched with designated conditions from the communication information extracted by said communication information extracting module and converting to a simulating procedure, said procedure converting module:

a. forming an initialization processing module of the simulating procedure and writing said initialization processing module into a simulating procedure file, reading said communication information from said second communication recording file, and determining whether a header exists in said communication information, b. determining a time difference between the communication information from any prior communication information which was previously read out and the communication information which has been read out in step (a) if said header exists, and if the time difference exists, writing a time wait command into said simulating procedure file, c. obtaining a simulation command by decoding said header and writing said simulation command into said simulating procedure file, wherein said simulation command comprises at least one of a communication start, a transmission, a reception, and a communication end, d. adding said data to said simulating procedure file if no header exists in the communication information and only data exists in said step (c), and e. repeating the processes in said steps (a to d) until no further communication information exists, then, when a final communication information is found, forming an end processing module of the simulating procedure and writing the end processing module into said simulating procedure file, thereby forming a series of simulating procedures; and a simulation processing module executing a communicating process in accordance with the simulating procedure converted by said procedure converting module.

2. An apparatus according to claim 1, wherein said procedure converting module forms said simulating procedure on a protocol unit basis.

3. An apparatus according to claim 1, wherein said procedure converting module has an edition processing module for correcting contents of the information when the extracted communication information is converted to simulating procedure information.

4. An apparatus according to claim 3, wherein said edition processing module forms a simulating procedure for a plurality of transmitting source units, as targets, for a specific reception destination unit on the basis of the converted simulating procedure.

5. An apparatus according to claim 3, wherein said edition processing module converts a file format of said simulating procedure to a file format which can be recognized by the user and, after that, corrects said file format and converts to the original file format after the correction.

6. An apparatus according to claim 3, wherein said edition processing module corrects intervals of one of a transmission time and a reception time in the simulating procedure before the correction and forms a simulating procedure for allowing a plurality of transmitting source units to simultaneously execute the simulating operations.

7. An apparatus according to claim 1, wherein the simulating procedure formed by said procedure converting module has a file structure of a simulation initialization processing module, a simulation communicating module, and a simulation end processing module, and said simulation communicating module arranges a simulation command and simulation command data based on the communication information collected from said transmission line between simulation control information at the start and end of the communication.

8. An apparatus according to claim 1, wherein said simulation processing module has a simulation defining module for defining simulator operating conditions and executes a communicating process with the reception destination unit on the basis of the simulator operating conditions defined by said simulation defining module and the simulating procedure converted by said procedure converting module.

9. An apparatus according to claim 8, wherein said simulation defining module changes the simulator operating conditions as necessary.

10. An apparatus according to claim 9, wherein said simulation defining module defines at least the number of transmitting source units which are simulated by the simulation, a unit name of the reception destination unit by the simulation, and a unit name of a simulator machine as simulator operating conditions.

11. An apparatus according to claim 10, wherein said simulation defining module defines a unit name of the unit itself as a unit name of the simulator machine.

12. An apparatus according to claim 11, wherein said simulation defining module further defines a unit name of another simulator machine provided for an external module as a unit name of the simulator machine.

13. An apparatus according to claim 10, wherein, said simulation defining module further defines a log file name, a simulator variable value, and an automatic execution command as simulator operating conditions.

14. An apparatus according to claim 13, wherein said automatic execution command defined by said simulator defining module is generated at a predetermined timing and provides a previously defined simulation operating situation to the simulator apparatus and to another unit connected through the lines, and controls an execution.

15. An apparatus according to claim 14, wherein as said automatic command, at least a simulation start command, a communication start command, a communication end command, and a simulation end execution command are defined.

16. An apparatus according to claim 1, wherein said simulator processing module comprises a simulator control module forming one or a plurality of group control modules on a transaction unit basis and activates said group control module, said group control module comprises a terminal control module and forms one or a plurality of transmitting source units simulating as simulators by an activation of said terminal control module, and said terminal control module provides said simulating procedure to said transmitting source unit, thereby allowing the simulating operation to be executed.

17. An apparatus according to claim 16, wherein in the case where a plurality of simulating procedures are obtained on a protocol unit basis, said simulator control module forms said group control module every simulating procedure and simultaneously executes the simulations of a plurality of transactions.

18. An apparatus according to claim 16, wherein in the case where the simulating procedures of a plurality of transactions are obtained by a conversion of a specific protocol, said simulator control module forms said group control module every simulating procedure and simultaneously executes the simulations of a plurality of transactions.

19. An apparatus according to claim 16, wherein when a plurality of names of the transmitting source units which operate as simulators are defined in addition to an own unit by said simulation defining module, said simulator control module forms said group control module to a plurality of units including the own unit and activates said group control module.

20. An apparatus according to claim 19, wherein said simulator control module sets the self module to a master, sets the group control module formed in the transmitting source unit in the outside to a slave, and activates them through said transmission line.

21. An apparatus according to claim 16, wherein the transmitting source unit module provided for said group control module records an operating situation each time a command of said simulating procedure is executed.

22. An apparatus according to claim 1, wherein said simulation processing module has a monitor control module for displaying a simulator operating situation in a real-time manner.

23. An apparatus according to claim 1, wherein said simulation processing module has a log control module for recording the simulator operation and forming log information.

24. An apparatus according to claim 23, wherein said simulation processing module has a performance collecting module for collecting and analyzing a system performance on the basis of the log information formed by said log control module and providing.

25. An apparatus according to claim 1, wherein said transmitting source unit is a client machine and said reception destination unit is a server machine.

26. An apparatus according to claim 1, wherein said transmitting source unit is a terminal machine and said reception destination unit is a host machine.

27. A method simulating a computer network system to which a plurality of units are connected via a transmission line and which performs a communicating process between an arbitrary transmitting source unit and a reception destination unit in accordance with a predetermined communication protocol, comprising:

- a line information collecting step of collecting communication information on said transmission line and storing said communication information into a first communication recording file;
- a communication information extracting step of extracting communication information matching a predetermined transmitting source, a reception destination, and a protocol identifier indicative of a transaction contents from the communication information collected by said line information collecting module and stored in said first communication recording file, and storing said extracted communication information into a second communication recording file;
- a procedure converting step of determining the communication information necessary for a simulation which is matched with designated conditions from the communication information extracted by said communication information extracting step and converting to a simulating procedure; and
- a simulation processing step of executing a communicating process in accordance with the simulating procedure converted by said procedure converting steps, wherein in said procedure converting step comprises the steps of:

- a. forming an initialization processing module of the simulating procedure and writing said initialization processing module into a simulating procedure file, reading said communication information from said second communication recording file, and determining whether a header exists in said communication information,
- b. determining a time difference between the communication information from any prior communication information which was previously read out and the communication information which has been read out in step (a) if said header is determined to exist, and if the time difference exists, writing a time wait command into said simulating procedure file,
- c. obtaining a simulation command by decoding said header and writing said simulation command into said simulating procedure file, wherein said simulation command comprises at least one of a communication start, a transmission, a reception, and a communication end,
- d. adding said data to said simulating procedure file if no header exists in the communication information and only data exists in said step (c), and
- e. repeating the processes in said steps (a to d) until no further communication information exists, then, when a final communication information is found, forming an end processing module of the simulating procedure and writing the end processing module into said simulating procedure file, thereby forming a series of simulating procedures.

28. A method according to claim 27, wherein in said procedure converting step, said simulating procedure is formed on a protocol unit basis.

29. A method according to claim 27, wherein said procedure converting step has an edition processing step of correcting contents of the information when the extracted communication information is converted to simulating procedure information.

30. A method according to claim 29, wherein in said edition processing step, a simulating procedure for a plurality of transmitting source units, as targets, for a specific reception destination unit is formed on the basis of the converted simulating procedure.

31. A method according to claim 29, wherein in said edition processing step, after a file format of said simulating procedure was converted to a file format which can be recognized by the user, said file format is converted to the original file format after the correction.

32. A method according to claim 29, wherein in said edition processing step, intervals of one of a transmission time and a reception time in the simulating procedure before the correction are corrected and a simulating procedure for allowing a plurality of transmitting source units to simultaneously execute the simulating operations.

33. A method according to claim 27, wherein the simulating procedure formed by said procedure converting step has a file structure of a simulation initialization process, a simulation communicating process, and a simulation end process, and in said simulation communicating process, a simulation command and simulation command data based on the communication information collected from said transmission line are arranged between simulation control information at the start and end of the communication.

34. A method according to claim 27, wherein said simulation processing step has a simulation defining step of defining simulator operating conditions, and a communicating process with the reception destination unit is executed on the basis of simulator operating conditions defined by said simulation defining step and the simulating procedure converted by said procedure converting step.

35. A method according to claim 34, wherein in said simulation defining step, the simulator operating conditions are changed as necessary.

36. A method according to claim 35, wherein in said simulation defining step, at least the number of transmitting source units which are simulated by the simulation, a unit name of a reception destination by the simulation, and a unit name of a simulator machine are defined as simulator operating conditions.

37. A method according to claim 36, wherein in said simulation defining step, a unit name of the unit itself is defined as a unit name of the simulator machine.

38. A method according to claim 37, wherein in said simulation defining step, a unit name of another simulator machine provided in the outside is further defined as a unit name of the simulator machine.

39. A method according to claim 36, wherein in said simulation defining step, a log file name, a simulator variable value, and an automatic execution command are further defined as simulator operating conditions.

40. A method according to claim 39, wherein said automatic execution command defined by the simulator defining step is a command which is generated at a predetermined timing and provides a previously defined simulation operating situation to a simulator apparatus itself and another unit connected through the line and controls execution.

41. A method according to claim 40, wherein in said simulator defining step, at least a simulation start command, a communication start command, a communication end command, and a simulation end command are defined as said automatic execution command.

42. A method according to claim 27, wherein said simulator processing step comprises a simulator control step, one or a plurality of group control steps are formed on a transaction unit basis and are activated in said simulator control step, said group control step comprises a terminal control step, and one or a plurality of transmitting source units for simulating as a simulator are formed by an activation of said terminal control step, and in said terminal control step, said simulating procedure is provided to said transmitting source unit, thereby allowing the simulating operation to be executed.

43. A method according to claim 42, wherein in said simulator control step, in the case where a plurality of simulating procedures are obtained on a protocol unit basis, said group control step is formed every simulating procedure and the simulations of a plurality of transactions are simultaneously executed.

44. A method according to claim 42, wherein in said simulator control step, in the case where the simulating procedures of a plurality of transactions are obtained by a conversion of a specific protocol, said group control step is formed every simulating procedure and the simulations of a plurality of transactions are simultaneously executed.

45. A method according to claim 42, wherein in said simulator control step when a plurality of names of the transmitting source units which operate as simulators are defined in addition to an own unit by said simulation defining step, said group control step is formed in a plurality of units including the own unit and said group protocol step is activated.

46. A method according to claim 45, wherein in said simulator control step, the self step is set to a master, the group control step formed in the transmitting source unit in the outside is set to a slave and is activated through said transmission line.

47. A method according to claim 42, wherein the transmitting source unit provided for said group control step records the operating situation each time a command of said simulating procedure is executed.

48. A method according to claim 43, wherein in said simulation processing step, the simulator operating situation is displayed in a real-time manner.

49. A method according to claim 43, wherein in said simulation processing step, the simulator operation is recorded and log information is formed.

50. A method according to claim 49, wherein in said simulation processing step, a system performance is collected and analyzed on the basis of said log information and is provided.

* * * * *